(12) United States Patent
Trivelpiece et al.

(10) Patent No.: US 11,694,057 B2
(45) Date of Patent: Jul. 4, 2023

(54) RFID TAG AND METHOD OF MAKING SAME

(71) Applicant: SENSORMATIC ELECTRONICS, LLC, Boca Raton, FL (US)

(72) Inventors: Steve E. Trivelpiece, Rancho Santa Margarita, CA (US); William M. Rider, Port St. Lucie, FL (US)

(73) Assignee: SENSORMATIC ELECTRONICS, LLC, Boca Raton, FL (US)

( * ) Notice: Subject to any disclaimer, the term of this patent is extended or adjusted under 35 U.S.C. 154(b) by 122 days.

(21) Appl. No.: 17/122,654

(22) Filed: Dec. 15, 2020

(65) Prior Publication Data

US 2021/0209436 A1 Jul. 8, 2021

Related U.S. Application Data

(60) Provisional application No. 62/956,886, filed on Jan. 3, 2020.

(51) Int. Cl.
*G06K 19/077* (2006.01)
*G06K 19/07* (2006.01)

(52) U.S. Cl.
CPC ..... *G06K 19/0772* (2013.01); *G06K 19/0723* (2013.01)

(58) Field of Classification Search
CPC ........... G06K 19/0772; G06K 19/0723; G06K 19/00; G06K 19/067; G06K 19/07
USPC ........................................ 235/492, 487, 375
See application file for complete search history.

(56) References Cited

U.S. PATENT DOCUMENTS

| | | |
|---|---|---|
| 6,646,336 B1 | 11/2003 | Marmaropoulos et al. |
| 7,253,735 B2 | 8/2007 | Gengel et al. |
| 7,489,248 B2 | 2/2009 | Gengel et al. |
| 7,843,399 B2 | 11/2010 | Stobbe |
| 8,536,075 B2 | 9/2013 | Leonard |
| 9,064,199 B2 | 6/2015 | Nitta |

(Continued)

FOREIGN PATENT DOCUMENTS

| | | | |
|---|---|---|---|
| CN | 101227024 B | * 3/2013 | ............ H01L 23/66 |
| EP | 1 630 728 A1 | 5/2003 | |

(Continued)

OTHER PUBLICATIONS

International Search Report and Written Opinion issued in corresponding International Application No. PCT/US2020/065414 dated Apr. 13, 2021.

*Primary Examiner* — Edwyn Labaze
(74) *Attorney, Agent, or Firm* — ArentFox Schiff LLP

(57) ABSTRACT

Aspects of the present disclosure includes a method of manufacturing a radio frequency identification (RFID) tag, including connecting a first wire and a second wire across a chip, maintaining the spaced apart distance between the first wire and the second wire adjacent to each side of the chip to define a spaced apart segment of the first wire and the second wire that forms part of an inductive loop, connecting the first wire and the second wire at each side of the chip distal from and adjacent to the spaced apart segment of the first wire and the second wire to close the inductive loop, define connected wire segments, and to form an RFID assembly, and moving the RFID assembly through a casing material at or above a glass transition temperature of the casing material to encase the RFID assembly.

11 Claims, 4 Drawing Sheets

(56) References Cited

U.S. PATENT DOCUMENTS

| | | | |
|---|---|---|---|
| 2010/0136746 A1 | 6/2010 | Brun et al. | |
| 2012/0007717 A1* | 1/2012 | Jong | G02B 6/3895 |
| | | | 343/720 |
| 2013/0092742 A1 | 4/2013 | Brun et al. | |
| 2014/0197832 A1* | 7/2014 | Driesel | H01Q 7/005 |
| | | | 324/322 |
| 2020/0381829 A1* | 12/2020 | Andia Vera | H01L 24/49 |

FOREIGN PATENT DOCUMENTS

| | | | | |
|---|---|---|---|---|
| EP | 2302566 A1 | | 3/2011 | |
| EP | 3319168 A1 | * | 5/2018 | G06K 19/077 |
| WO | 2007051110 A2 | | 5/2007 | |
| WO | 2008114091 A2 | | 9/2008 | |

* cited by examiner

RFID TAG AND METHOD OF MAKING SAME

CROSS-REFERENCE TO RELATED APPLICATIONS

The current application claims priority to and benefits from U.S. Provisional Application No. 62/956,886 filed on Jan. 3, 2020, entitled "RFID TAG AND METHOD OF MAKING SAME," the contents of which are hereby incorporated by reference in their entireties.

BACKGROUND

Radio frequency identification (RFID) tags may be used in a wide range of applications, such as inventory control and loss prevention. Given the prevalence of RFID tag applications in various environments, improvements in RFID tags are desired.

SUMMARY

This summary is provided to introduce a selection of concepts in a simplified form that are further described below in the DETAILED DESCRIPTION. This summary is not intended to identify key features of the claimed subject matter, nor is it intended to be used as an aid in determining the scope of the claimed subject matter.

An aspect of the present disclosure includes a method of manufacturing a radio frequency identification (RFID) tag, comprising: connecting a first wire and a second wire across a chip, wherein the first wire and the second wire are at a spaced apart distance and substantially parallel to one another; maintaining the spaced apart distance between the first wire and the second wire adjacent to each side of the chip to define a spaced apart segment of the first wire and the second wire that forms part of an inductive loop; connecting the first wire and the second wire at each side of the chip distal from and adjacent to the spaced apart segment of the first wire and the second wire to close the inductive loop, define connected wire segments, and to form an RFID assembly, wherein a distance between opposite ends of the connected wire segments defines an antenna length formed by the first wire and the second wire; and moving the RFID assembly through a casing material at or above a glass transition temperature of the casing material to encase the RFID assembly.

Some aspects of the present disclosure includes a string of a plurality of radio frequency identification (RFID) tags including a first wire, a second wire, a first RFID tag including a first chip and a first portion of the first wire and a first portion of the second wire; having spaced apart and connected segments defining a first inductive loop and a first antenna formed in a vertical optical fiber making system, a second RFID tag connected to the first RFID tag, the second RFID tag including a second chip and a second portion of the first wire and a second portion of the second wire having spaced apart and connected segments defining a second inductive loop and a second antenna formed in the vertical optical fiber making system, and a casing material encasing the first RFID tag and the second RFID tag.

BRIEF DESCRIPTION OF THE DRAWINGS

The features believed to be characteristic of aspects of the disclosure are set forth in the appended claims. In the description that follows, like parts are marked throughout the specification and drawings with the same numerals, respectively. The drawing figures are not necessarily drawn to scale and certain figures may be shown in exaggerated or generalized form in the interest of clarity and conciseness. The disclosure itself, however, as well as a preferred mode of use, further objects and advantages thereof, will be best understood by reference to the following detailed description of illustrative aspects of the disclosure when read in conjunction with the accompanying drawings, wherein:

DETAILED DESCRIPTION

Figure 1:
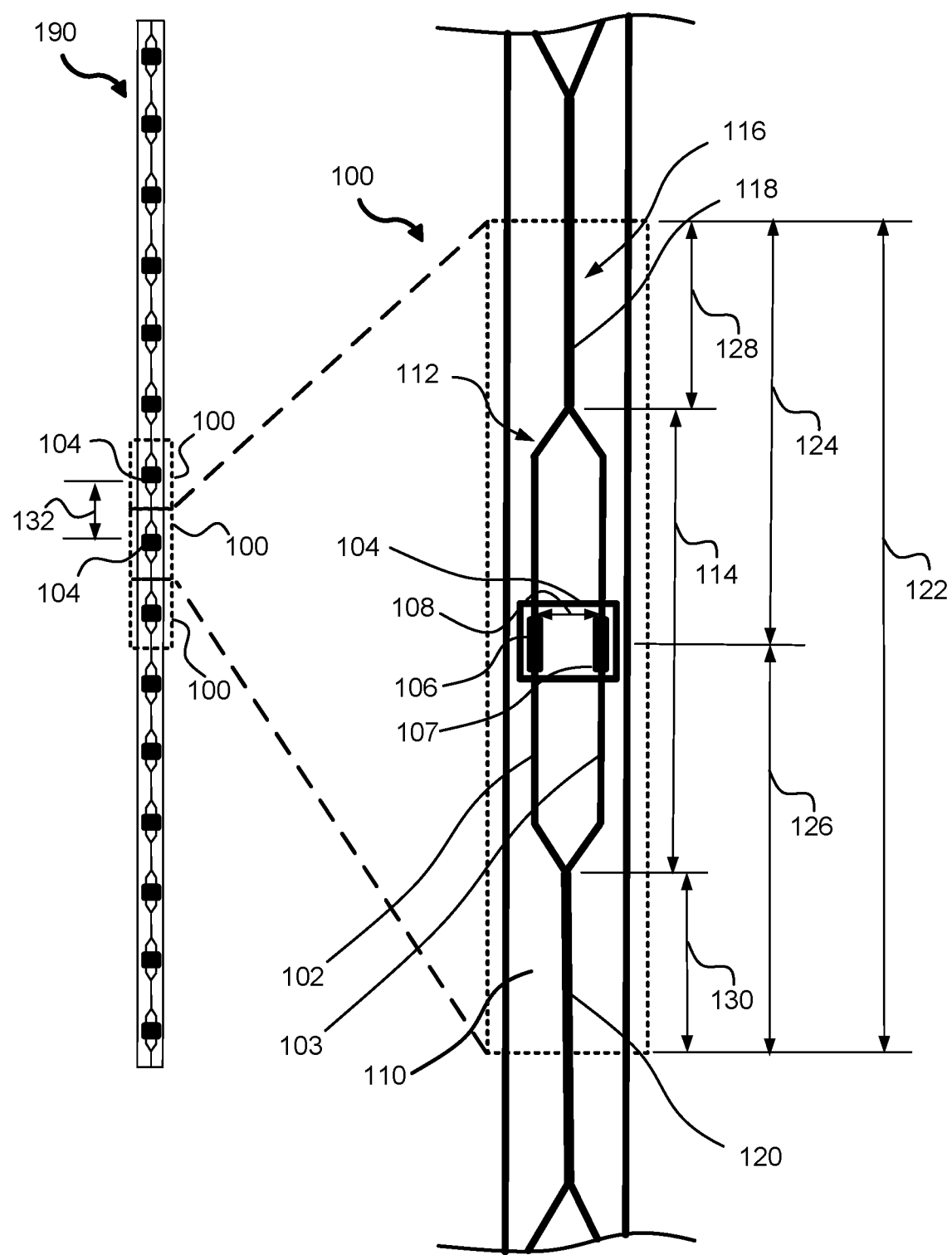
FIG. 1 is a top plan view of an example of an encased string of a plurality of RFID tags, including a close-up view of one of the RFID tags, in accordance with aspects of the present disclosure.

In some instances, two wires may be coupled and/or electrically connected to a semiconductor chip to form a RFID tag. An electro-magnetic signal may be transmitted to the RFID tag and received by the two wires (e.g., functioning as antennas for the semiconductor chip). The electro-magnetic signal may be converted to an electrical signal. The semiconductor chip may include an intrinsic impedance (e.g., capacitance and/or resistance). In order to increase the electrical energy (in the electrical signal) absorbed by the semiconductor chip, two portions of the two wires may be coupled together to form an inductor. The reactance of the inductor may lower the intrinsic impedance, and cause the semiconductor chip to better "match" the electrical signal.

In an implementation, each RFID tag may be formed in an optical fiber-making process configured to make an encased string of a plurality of RFID tags, where a position of two or more wires relative to an RFID semiconductor chip is variably controlled to form antenna and inductive loop elements of each RFID tag. For example, in the process, which may include a vertical drawing system, the two or more wires may be fed from spools and connected to spaced apart connector pads on respective ones of a plurality of RFID semiconductor chips located at intervals along a length of a fiber optic preform, thereby forming a string of a plurality of the RFID tags. The two or more wires may be connected to the connector pads by soldering, gluing, or any other process that enables an electrical connection between each wire and each connector pad. The process controls the spacing of the two or more wires to enable the wires to be positioned substantially parallel to one another to connect to the corresponding one of the spaced apart pads on each semiconductor chip. Further, the process is configured to maintain the substantially parallel, spaced apart positioning of the two or more wires for a distance from each end of the semiconductor chip to create spaced apart wire segments proximal to each end of the semiconductor chip, thereby forming an inductive loop. Additionally, the process is configured to control the positioning of the two or more wires to join or connect the two or more wires to form connected wire segments distal from each end of the semiconductor chip, thereby forming corresponding antenna elements defining a dipole antenna. In some examples, the process may control the configuration of the spacing or the connecting of the wires through one or more components, such as but not limited to physical probes or electromagnetic elements configured to act on the wires at certain intervals during the drawing of the wires and fiber optic preform carrying the plurality of RFID semiconductor chips through the vertical drawing system. Further, the process draws the string of the plurality of RFID tags through a liquid form of a casing material, such as a material used to form an optical fiber. Then, the casing material is cooled, thereby sealing the plurality of RFID tags in the casing material and forming the encased string of the plurality of RFID tags. Thus, the optical fiber-making process operated as described herein may quickly and efficiently form an optical fiber of an encased string of a plurality of RFID tags. Subsequently, the fiber may be cut into one or more lengths each including a single RFID tag, and each RFID tag may be attached to an item, such as a garment, so that the item may be tracked.

Referring to FIG. 1, an example of a radio frequency identification (RFID) device 100 included in a string 190 of RFID devices 100 may include an antenna and an inductive loop formed by at least two wires 102 and 103 that are variably positioned, such as in an optical fiber-making process. For example, the at least two wires 102 and 103 may be formed from any electrically conductive material, such as but not limited to copper, aluminum, silver, copper coated with silver, etc. The RFID device 100 may include an RFID semiconductor chip 104 that receives electrical signals (converted from the electro-magnetic signals) via the two wires 102 and 103. The RFID semiconductor chip 104 may include a memory including a tag identifier and other information, which may be connected to an electrical circuit and a transmitter that is energized by the electrical signals to generate and transmit a signal including the tag identifier and/or the other information. The RFID semiconductor chip 104 may include at least two solder pads 106 and 107, spaced apart by a spaced apart distance 108 across a surface of the RFID semiconductor chip 104, which respectively couple or electrically connect the two wires 102 and 103 to the electrical circuit of the RFID semiconductor chip 104. The solder pads 106 and 107 may be an exposed metal or other electrically conductive material that is electrically connected to the electrical circuit of the RFID semiconductor device 104, and which may include a solder layer to electrically connect with the wires 102 and 103. Further, the RFID device 100 may include a casing material 110 enclosing or substantially enclosing the RFID semiconductor chip 104 and the two wires 102 and 103 to provide protection against moisture and/or contaminants. For example, the casing material 110 may be a plastic, a glass, a polycarbonate, or another other material that may be used to form an optical fiber.

The RFID device 100 includes an inductive loop 112 formed by the configuration of the two wires 102 and 103 being maintained at the spaced apart distance 108 adjacent to each end of the RFID semiconductor chip 104 before being joined together. For example, the spaced apart wires 102 and 103 extend across and away from the RFID semiconductor chip 104 for a distance before being connected together at distal ends, thereby forming a loop shape. The inductive loop 112 may have a loop length 114, which in an implementation may be longitudinally centered at a center of the RFID semiconductor chip 104. The size and shape of the inductive loop 112 may be configured to match an impedance of the RFID semiconductor chip 104.

Additionally, the RFID device 100 includes a dipole antenna 116 formed primarily by opposing connected wire segments 118 and 120 extending along a same axis in opposite directions beyond the ends of the inductive loop 112. The antenna length 122 of the dipole antenna 116 may be based on the respective lengths of the opposing antenna sections 124 and 126, each of which are defined by the respective connected wire segment lengths 128 and 130 plus half of the inductor loop length 114. Further, the antenna length 122 of the dipole antenna 116 may be sized based on a wavelength of a frequency of operation. For example, for RFID applications, the frequency of operation may be 868 MHz or 915 MHz, and the antenna length 122 may be sized such that the dipole antenna 116 defines a half wave antenna.

The configuration and composition or materials of the at least two wires 102 and 103, the casing material 110, the inductive loop 112, and the antenna 116 may be varied based on the performance requirements of the RFID device 100 and/or the materials used for other ones of the components of the RFID device 100. In an example, the material used for the casing material 110 may affect the resonance of the antenna 116, and thus the antenna length 122 may vary based on the casing material.

In one aspect, the antenna 116 (and, hence, the RFID device 100) may have a length 122 of 0.5 centimeters (cm), 1 cm, 2 cm, 3 cm, 5 cm, 10 cm, 20 cm, 30 cm, or 50 cm. The length 122 may depend on the wavelength/frequency of the electro-magnetic signals received by the RFID device 100. In one implementation, the length 122 may be a half wavelength of the wavelength of the electro-magnetic signals of the frequency of operation so the antenna section lengths 124 and 126 are approximately a quarter-wavelength of the wavelength of the electro-magnetic signals. Although illustrated as being a same length, the antenna section lengths 124 and 126 may be different lengths. In some instances, the design of the length 122 may be to maximize the power absorption of the electro-magnetic signals by the semiconductor chip 104.

In other aspects, the loop length 114 of the inductive loop 112 may be 0.05 cm, 0.1 cm, 0.2 cm, 0.5 cm, 1 cm, 2 cm, 3 cm, 5 cm, 10 cm, 12 cm, or 20 cm. The loop length 114 may be designed such that the two wires 102 and 103 form the inductive loop 112 to have an inductance/reactance value that fully or partially matches an impedance value of the RFID semiconductor chip 104. The inductive loop 112 may increase the absorption of the electro-magnetic signals by the RFID semiconductor chip 104.

In one example of the present disclosure, the RFID device 100 may be a part of a string 190 of the plurality of RFID devices 100, each of which may be spaced apart on the string 190 by a chip spacing distance 132. In some cases, the chip spacing distance 132 may be the antenna length 122 or the length of the RFID device 100. In other cases, though, such as to allow for manufacturing tolerances, the chip spacing distance 132 may be longer than the antenna length 122 or the length of the RFID device 100. In other words, in this case, the adjoining connected wire segments of two adjacent RFID devices 100 in the string 190 may be longer than dictated by the device performance requirement, and hence a section of the adjoining connected wire segments may be cut out to form the final dimension of the antenna length 122 or the length of the RFID device 100.

Further, the string 190 of the plurality of RFID devices 100 may have a diameter ranging from 0.02 cm to about 0.2 cm, or any diameter capable of being formed in an optical fiber making process. Additionally, the string 190 of the plurality of RFID devices 100 may have any length, such as a length that can be wrapped around a spool.

Figure 2:
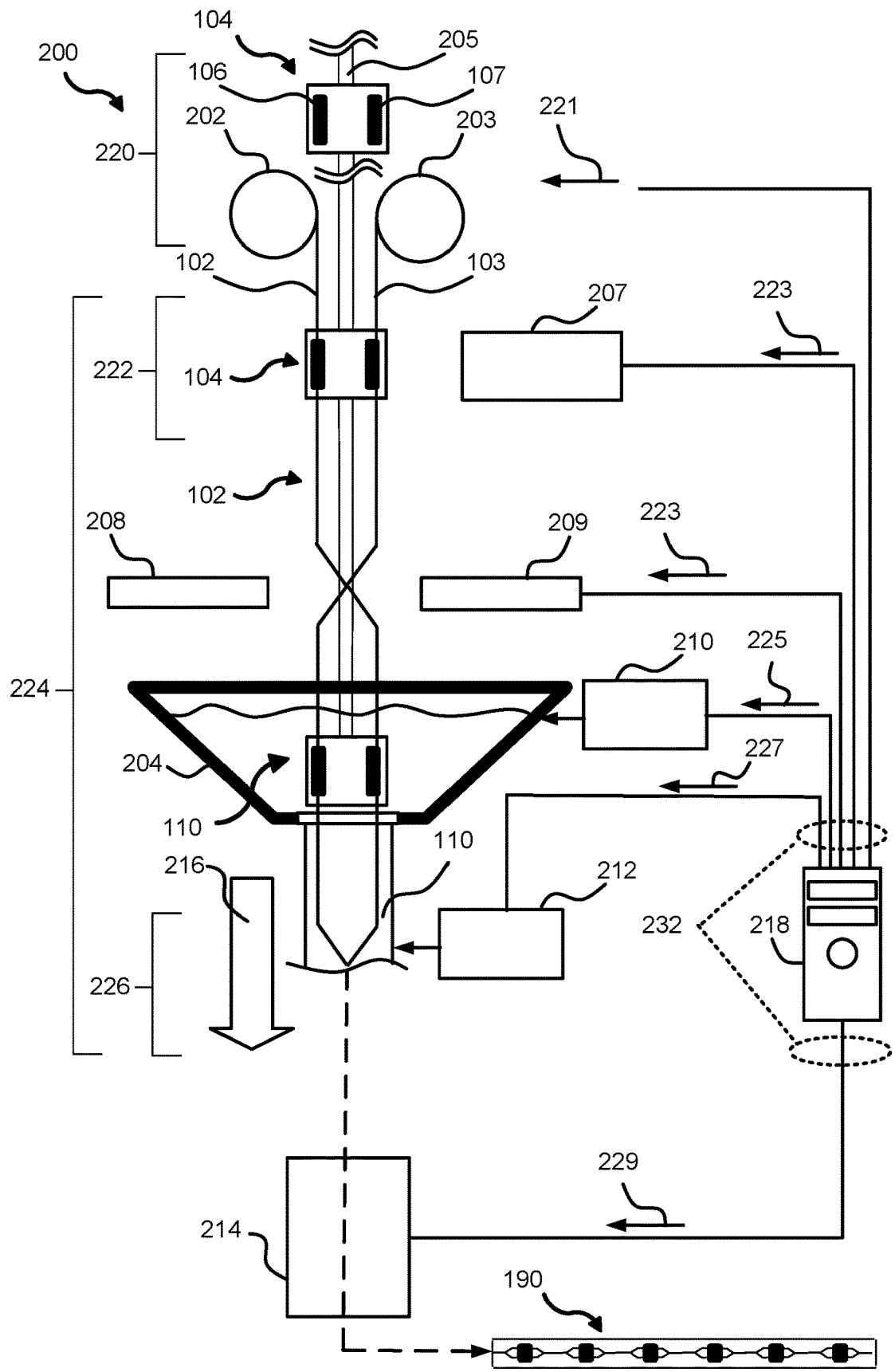
FIG. 2 is a schematic diagram an example of a manufacturing process for making a string of RFID tags in accordance with aspects of the present disclosure.

Turning to FIG. 2 and referencing FIG. 1, an example of an environment 200, including a vertical fiber drawing system, for manufacturing the string 190 including the encased plurality of RFID devices 100 may include a first spool 202 of wire 102 and a second spool 203 of wire 103 configured to provide the wires 102 and 103 for the manufacturing of the string 190 of RFID devices. Further, the environment 200 includes a length of a fiber optic preform 205 having the plurality of RFID semiconductor chips 104 mounted at intervals thereon. For example, the fiber optic preform 205 may be an elongated cylinder formed of material, such as a plastic or glass, to which the casing material 110 may attach to form an optical fiber via processing through the vertical fiber drawing system. Additionally, the environment 200 may include a bonding device 207 that bonds the two wires 102 and 103 to the semiconductor chip 104, where the bonding may include contacting, gluing, and/or soldering. The environment 200 may include one or more wire control devices 208 and 209 that selectively combine or separate the two wires 102 and 103, wherein the connecting may include positioning in contact and/or soldering together. In one example, the wire control device(s) 208 and 209 may use magnetic fields to combine or separate the two wires 102 and 103. In another example, the wire control devices 208 and 209 may use physical guides or probes to mechanically combine or separate the two wires 102 and 103. In some cases, the wire control device(s) 208 and 209 may apply solder and/or heat to connect the two wires 102 and 103. Further, the environment 200 may include a container 204 holding a liquid or semi-liquid form of the casing material 110. The casing material 110 may be a plastic, a glass, or a polymer, such as polycarbonate, polyethylene, or poly(methyl methacrylate), held in the container 204 at a temperature above its glass transition temperature. The environment 200 may include a heating device 210 that controllably heats the casing material 110 in the container 204 to or above the glass transition temperature. The heating device 210 may optionally include temperature sensors, such as thermocouples or infrared sensors, to monitor the temperature of the casing material 110 in the container 204. The environment 200 may also include a curing device 212 configured to cure the casing material 110 around the RFID device 100 after it has been drawn through the container 204 of the liquid or semi-liquid casing material 110. For example, the curing device 212 may include a light generator configured to generate light of having a wavelength designed to cure the casing material 110, e.g., transition the casing material 110 from a liquid or semi-liquid state to a solid state or to a state below the glass transition state. Also, the environment 200 may include a pulling device 214 that pulls the wires 102, 103 and the fiber optic preform 205 in direction 216 through the vertical drawing system to form the string 190.

In some examples, the environment 200 may include a controller 218 for controlling the operations of the components of the vertical drawing system, such as but not limited to the first spool 202, the second spool 203, another spool feeding in the fiber optic preform 205 including the RFID semiconductor chips 104, the bonding device 207, the heating device 210, the wire control devices 208, 209, the curing device 212, and/or the pulling device 214. The environment 200 may include communication links 232 configured to carry control signals and/or feedback signals between the controller 218 and one or more of the system components.

During operation, in one example, the controller 218 may transmit one or more signals to control the vertical drawing process to form the string 190 of the plurality of RFID devices 100. For instance, during a feed stage 220, the controller 218 may send one or more feed control signals 221 to control an input speed of the wires 102 and 103 and the fiber optic preform 205 including the RFID semiconductor chips 104 being fed into the vertical fiber drawing system.

During a bonding stage 222 of the process, the wires 102 and 103 and the fiber optic preform 205 may be pulled apart and/or drawn together, via physical guiding members and/or electromagnetic fields of bonding device 207 as controlled by one or more bonding control signals 223, so that each of the wires 102 and 103 is spaced apart by the spaced apart distance 108 and positioned to contact and/or be soldered to the corresponding one of the solder pads 106 and 107.

During a configuration stage 224 of the process, which in some cases may include or overlap with the bonding stage 222, the one or more wire control devices 208 and 209 respond to one or more bonding control signals 223 to control a position of each wire 102 and 103 and/or a configuration of the wires 102 and 103 relative to the RFID semiconductor chip 104. For example, as the wires 102, 103 and the fiber optic preform 205 including the RFID semiconductor chips 104 are drawn down through the vertical fiber drawing system, the one or more wire control devices 208 and 209 may actuate at intervals and for durations based on the velocity of the drawing process to either maintain the spaced apart distance 108 between the wires 102, 103 and/or to cause the wires to connect in order to configure each RFID device 100 to have spaced apart or connected wires to form the antenna 116 having antenna length 122 and the inductive loop 112 having loop length 114.

It should be understood that the one or more wire control devices 208 and 209 may be located at any point along the vertical fiber drawing system in order to act upon the two wires 102 and 103 to control their position to form the connected and spaced apart segments of wire relative to the RFID semiconductor chip 104 in order to form the RFID device 100.

Further, during the configuration stage 224 and/or throughout the process, the controller 218 may transmit a heating control signal 225 to the heating device 210 to heat the casing material 110 in the container 204 to at or above a glass transition temperature. As such, as the wires 102, 103 and the fiber optic preform 205 including the RFID semiconductor chips 104 is drawn through the container 204, the casing material 110 encompasses and adheres to the wires 102, 103 and the fiber optic preform 205 including the RFID semiconductor chips 104, thereby forming an outer casing layer.

Additionally, during a curing stage 226, the controller 218 may transmit a curing control signal 227 to the curing device 212 to control output of a curing mechanism, such as light or heat, to cause the casing material 110 to transition to a solid form and encase the configured RFID devices 100 in a protective outer layer. Further, the curing that occurs during the curing stage 226 may also assist in maintaining the configuration of the wires 102, 103 relative to one another and/or relative to the RFID semiconductor chips 104.

Further, throughout the process, the controller 218 may transmit a pulling control signal 229 to the pulling device 214 to draw the string 190 through the vertical fiber drawing system. The pulling control signal 229 may include an indication of the pulling speed. The pulling speed may influence the thickness of the casing material 110, yield, production volume, etc. The pulling device 214 may pull the string 190 by pulling a portion of the string 190.

Thus, the environment 200 including the vertical fiber drawing process, produces a length of the string 190 of the plurality of RFID devices 100, which may be wound about a spool for storage or for dispensing during a subsequent manufacturing process.

Figure 3:
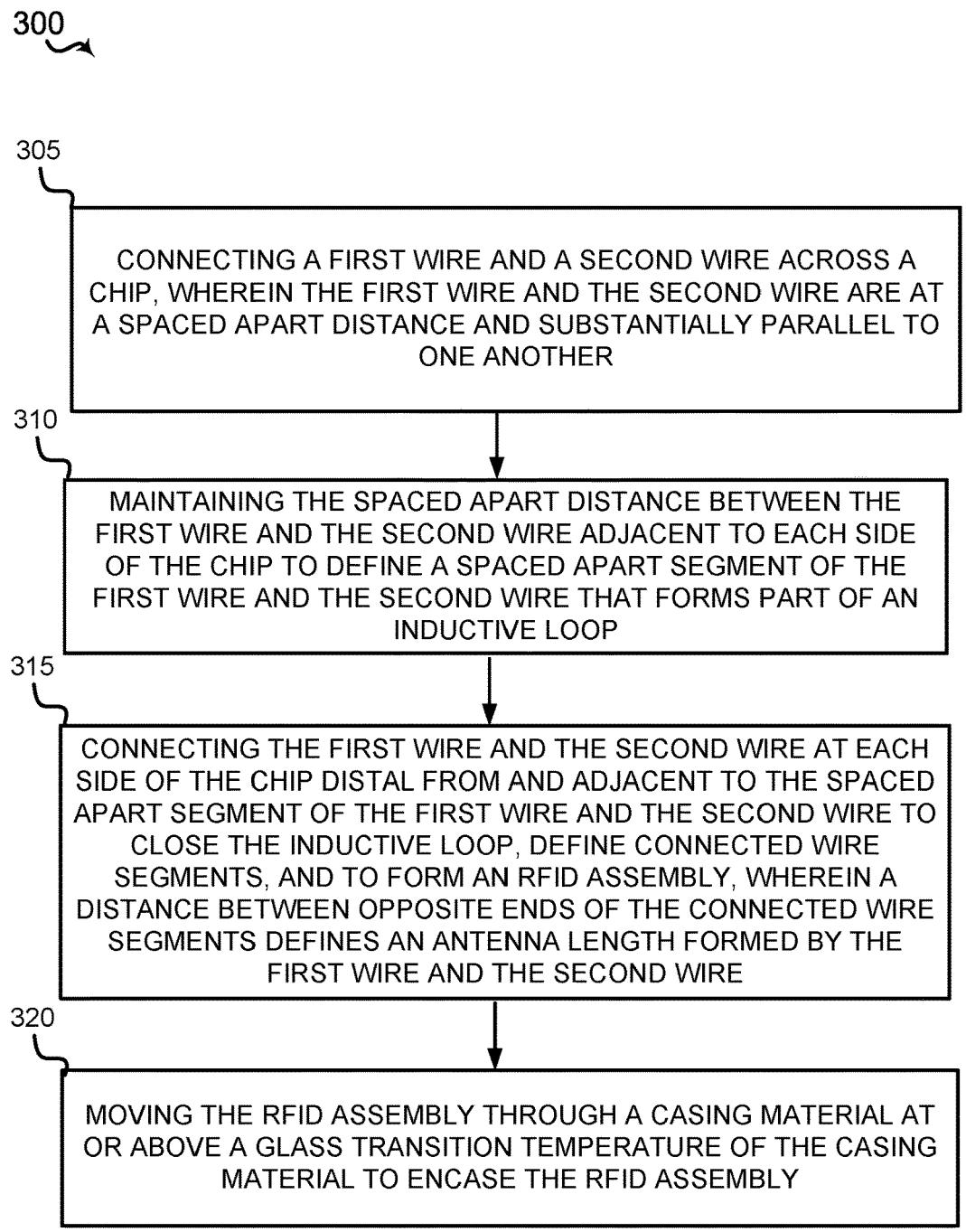
FIG. 3 is a flowchart of an example method for manufacturing a string of RFID tags in accordance with aspects of the present disclosure.

Turning now to FIG. 3, a method 300 of manufacturing the string 190 including the RFID device 100 may be performed by one or more components of the environment 200, such as but not limited to the controller 218, the bonding device 207, the wire control devices 208 and 209, the heating device 210, the curing device 212, and/or the pulling device 214.

At block 305, the method 300 may connect a first wire and a second wire across a chip, wherein the first wire and the second wire are spaced apart and substantially parallel to one another. For example, the bonding device 207 and/or the controller 218 may connect the two wires 102 and 103 to the RFID semiconductor chip 104 via the one or more solder bumps 106 and 107. The bonding device 207 and/or the controller 218 may be configured to and/or provide means for connecting a first wire and a second wire across a chip, wherein the first wire and the second wire are spaced apart and substantially parallel to one another.

At block 310, the method 300 may maintain the spaced apart distance between the first wire and the second wire adjacent to each side of the chip to define a spaced apart segment of the first wire and the second wire that forms part of an inductive loop. For example, the controller 218, the bonding device 207, and/or the wire control devices 208 and 209 may maintain the spaced apart distance between the first wire and the second wire adjacent to each side of the chip to define a spaced apart segment of the first wire and the second wire that forms part of an inductive loop. The controller 218, the bonding device 207, and/or the wire control devices 208 and 209 may be configured to and/or define means for maintaining the spaced apart distance between the first wire and the second wire adjacent to each side of the chip to define a spaced apart segment of the first wire and the second wire that forms part of an inductive loop.

At block 315, the method 300 may connect the first wire and the second wire at each side of the chip distal from and adjacent to the spaced apart segment of the first wire and the second wire to close the inductive loop, define connected wire segments, and to form an RFID assembly, wherein a distance between opposite ends of the connected wire segments defines an antenna length formed by the first wire and the second wire. For example, the controller 218, the bonding device 207, the wire control devices 208 and 209, the heating device 210, and/or the curing device 212 may connect the first wire and the second wire at each side of the chip distal from and adjacent to the spaced apart segment of the first wire and the second wire to close the inductive loop, define connected wire segments, and to form an RFID assembly, wherein a distance between opposite ends of the connected wire segments defines an antenna length formed by the first wire and the second wire. The controller 218, the bonding device 207, the wire control devices 208 and 209, the heating device 210, and/or the curing device 212 may be configured to and/or define means for connecting the first wire and the second wire at each side of the chip distal from and adjacent to the spaced apart segment of the first wire and the second wire to close the inductive loop, define connected wire segments, and to form an RFID assembly, wherein a distance between opposite ends of the connected wire segments defines an antenna length formed by the first wire and the second wire.

At block 320, the method 300 may move the RFID assembly through a casing material at or above a glass transition temperature of the casing material to encase the RFID assembly. For example, the controller 218 and/or the pulling device 214 may move the RFID assembly through a casing material at or above a glass transition temperature of the casing material to encase the RFID assembly. the controller 218 and/or the pulling device 214 may be configured to and/or define means for moving the RFID assembly through a casing material at or above a glass transition temperature of the casing material to encase the RFID assembly.

In one aspect of the present disclosure, the method 300 may include curing the casing material, and may be repeated to produce the string 190 of RFID devices 100.

Figure 4:
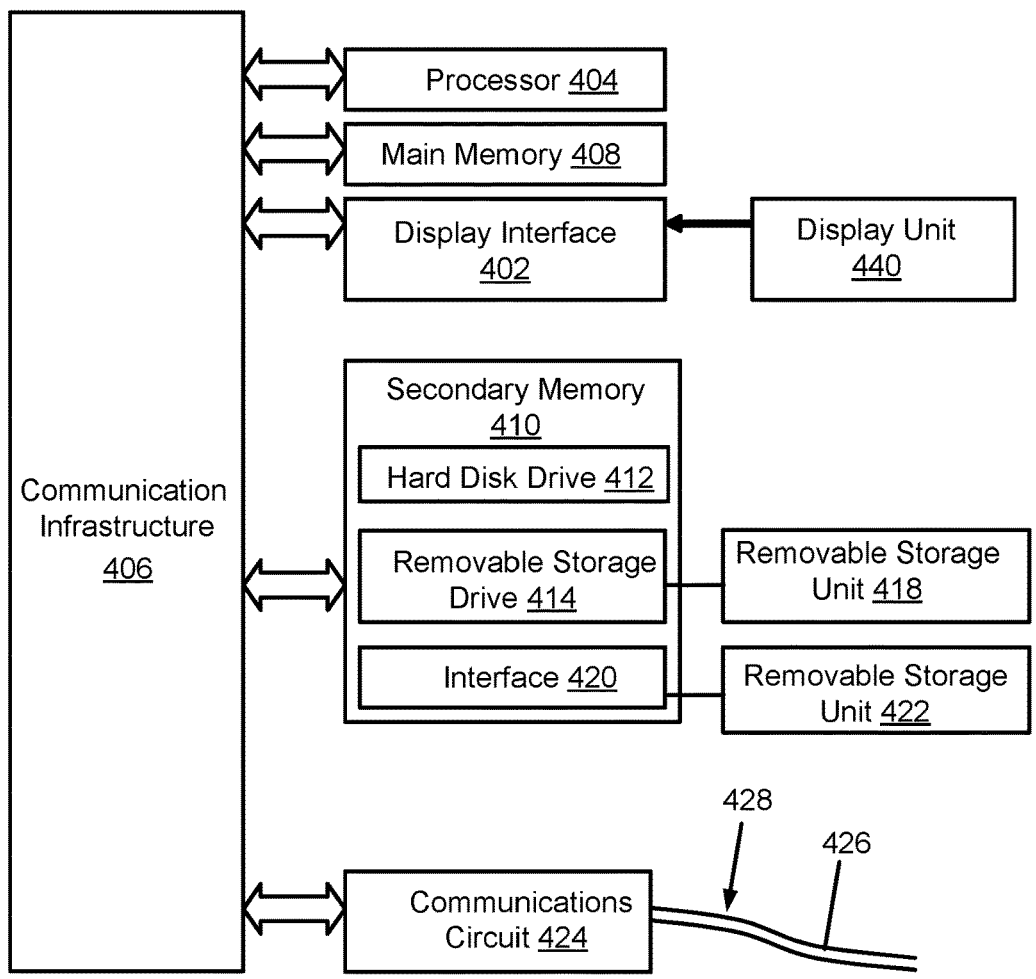
FIG. 4 is a schematic diagram of an example of a computer system in accordance with aspects of the present disclosure.

Aspects of the present disclosures may be implemented using hardware, software, or a combination thereof and may be implemented in one or more computer systems or other processing systems. In an aspect of the present disclosures, features are directed toward one or more computer systems capable of carrying out the functionality described herein. An example of such the computer system 400 is shown in FIG. 4. In some examples, the controller 218 may be implemented as the computer system 400 shown in FIG. 4. The controller 218 may include some or all of the components of the computer system 400.

The computer system 400 includes one or more processors, such as processor 404. The processor 404 is connected with a communication infrastructure 406 (e.g., a communications bus, cross-over bar, or network). Various software aspects are described in terms of this example computer system. After reading this description, it will become apparent to a person skilled in the relevant art(s) how to implement aspects of the disclosures using other computer systems and/or architectures.

The computer system 400 may include a display interface 402 that forwards graphics, text, and other data from the communication infrastructure 406 (or from a frame buffer not shown) for display on a display device 440. Computer system 400 also includes a main memory 408, preferably random access memory (RAM), and may also include a secondary memory 410. The secondary memory 410 may include, for example, a hard disk drive 412, and/or a removable storage drive 414, representing a floppy disk drive, a magnetic tape drive, an optical disk drive, a universal serial bus (USB) flash drive, etc. The removable storage drive 414 reads from and/or writes to a removable storage unit 418 in a well-known manner. Removable storage unit 418 represents a floppy disk, magnetic tape, optical disk, USB flash drive etc., which is read by and written to removable storage drive 414. As will be appreciated, the removable storage unit 418 includes a computer usable storage medium having stored therein computer software and/or data. In some examples, one or more of the main memory 408, the secondary memory 410, the removable storage unit 418, and/or the removable storage unit 422 may be a non-transitory memory.

Alternative aspects of the present disclosures may include secondary memory 410 and may include other similar devices for allowing computer programs or other instructions to be loaded into computer system 400. Such devices may include, for example, a removable storage unit 422 and an interface 420. Examples of such may include a program cartridge and cartridge interface (such as that found in video game devices), a removable memory chip (such as an erasable programmable read only memory (EPROM), or programmable read only memory (PROM)) and associated socket, and other removable storage units 422 and interfaces 420, which allow software and data to be transferred from the removable storage unit 422 to computer system 400.

Computer system 400 may also include a communications circuit 424. The communications circuit 424 may allow software and data to be transferred between computer system 400 and external devices. Examples of the communications circuit 424 may include a modem, a network interface (such as an Ethernet card), a communications port, a Personal Computer Memory Card International Association (PCMCIA) slot and card, etc. Software and data transferred via the communications circuit 424 are in the form of signals 428, which may be electronic, electromagnetic, optical or other signals capable of being received by the communications circuit 424. These signals 428 are provided to the communications circuit 424 via a communications path (e.g., channel) 426. This path 426 carries signals 428 and may be implemented using wire or cable, fiber optics, a telephone line, a cellular link, an RF link and/or other communications channels. In this document, the terms "computer program medium" and "computer usable medium" are used to refer generally to media such as the removable storage unit 418, a hard disk installed in hard disk drive 412, and signals 428. These computer program products provide software to the computer system 400. Aspects of the present disclosures are directed to such computer program products.

Computer programs (also referred to as computer control logic) are stored in main memory 408 and/or secondary memory 410. Computer programs may also be received via communications circuit 424. Such computer programs, when executed, enable the computer system 400 to perform the features in accordance with aspects of the present disclosures, as discussed herein. In particular, the computer programs, when executed, enable the processor 404 to perform the features in accordance with aspects of the present disclosures. Accordingly, such computer programs represent controllers of the computer system 400.

In an aspect of the present disclosures where the method is implemented using software, the software may be stored in a computer program product and loaded into computer system 400 using removable storage drive 414, hard disk drive 412, or communications interface 420. The control logic (software), when executed by the processor 404, causes the processor 404 to perform the functions described herein. In another aspect of the present disclosures, the system is implemented primarily in hardware using, for example, hardware components, such as application specific integrated circuits (ASICs). Implementation of the hardware state machine so as to perform the functions described herein will be apparent to persons skilled in the relevant art(s).

The term "processor," as used herein, can refer to a device that processes signals and performs general computing and arithmetic functions. Signals processed by the processor can include digital signals, data signals, computer instructions, processor instructions, messages, a bit, a bit stream, or other computing that can be received, transmitted and/or detected. A processor, for example, can include microprocessors, microcontrollers, digital signal processors (DSPs), field programmable gate arrays (FPGAs), programmable logic devices (PLDs), state machines, gated logic, discrete hardware circuits, and other suitable hardware configured to perform the various functionality described herein.

The term "bus," as used herein, can refer to an interconnected architecture that is operably connected to transfer data between computer components within a singular or multiple systems. The bus can be a memory bus, a memory controller, a peripheral bus, an external bus, a crossbar switch, and/or a local bus, among others.

The term "memory," as used herein, can include volatile memory and/or nonvolatile memory. Non-volatile memory can include, for example, ROM (read only memory), PROM (programmable read only memory), EPROM (erasable PROM) and EEPROM (electrically erasable PROM). Volatile memory can include, for example, RAM (random access memory), synchronous RAM (SRAM), dynamic RAM (DRAM), synchronous DRAM (SDRAM), double data rate SDRAM (DDR SDRAM), and direct RAM bus RAM (DR-RAM).

It will be appreciated that various implementations of the above-disclosed and other features and functions, or alternatives or varieties thereof, may be desirably combined into many other different systems or applications. Also that various presently unforeseen or unanticipated alternatives, modifications, variations, or improvements therein may be subsequently made by those skilled in the art which are also intended to be encompassed by the following claims.

What is claimed is:

1. A method of manufacturing a radio frequency identification (RFID) tag, comprising:
   connecting a first wire and a second wire across a chip, wherein the first wire and the second wire are at a spaced apart distance and substantially parallel to one another;
   maintaining the spaced apart distance between the first wire and the second wire adjacent to each side of the chip to define a spaced apart segment of the first wire and the second wire that forms part of an inductive loop;
   connecting the first wire and the second wire at each side of the chip distal from and adjacent to the spaced apart segment of the first wire and the second wire to close the inductive loop, define connected wire segments, and to form an RFID assembly, wherein a distance between opposite ends of the connected wire segments defines an antenna length formed by the first wire and the second wire; and
   moving the RFID assembly through a casing material at or above a glass transition temperature of the casing material to encase the RFID assembly.

2. The method of claim 1, wherein the chip is mounted on a preform including a plurality of chips, and further comprising performing the method of claim 1 for each of the plurality of chips as the preform and the first wire and the second wire are being drawn through a vertical optical fiber making system.

3. The method of claim 1, wherein the casing material is a plastic, a glass, or a polycarbonate.

4. The method of claim 1, wherein at least one of the first wire or the second wire is between 0.5 centimeter (cm) to 30 cm.

5. The method of claim 1, wherein a length of the inductive loop is between 0.1 cm to 12 cm.

6. The method of claim 1, wherein a reactance of the inductive loop partially or fully matches an impedance of the chip.

7. A string of a plurality of radio frequency identification (RFID) tags, comprising:
   a first wire;
   a second wire;

a first RFID tag comprising:
  a first chip;
  a first portion of the first wire and a first portion of the second wire; having spaced apart and connected segments defining a first inductive loop and a first antenna formed in a vertical optical fiber making system;
a second RFID tag connected to the first RFID tag, the second RFID tag comprising:
  a second chip;
  a second portion of the first wire and a second portion of the second wire having spaced apart and connected segments defining a second inductive loop and a second antenna formed in the vertical optical fiber making system; and
a casing material encasing the first RFID tag and the second RFID tag.

8. The string of the plurality of RFID tags of claim 7, wherein the casing material is a plastic, a glass, or a polycarbonate.

9. The string of the plurality of RFID tags of claim 7, wherein at least one of the first wire or the second wire is between 0.5 centimeter (cm) to 30 cm.

10. The string of the plurality of RFID tags of claim 7, wherein a length of at least one of the first inductive loop or the second inductive loop is between 0.1 cm to 12 cm.

11. The string of the plurality of RFID tags of claim 7, wherein a reactance of the inductive loop partially or fully matches an impedance of the chip.

\* \* \* \* \*